(12) United States Patent
Brazas et al.

(10) Patent No.: US 6,507,706 B1
(45) Date of Patent: Jan. 14, 2003

(54) COLOR SCANNERLESS RANGE IMAGING SYSTEM USING AN ELECTROMECHANICAL GRATING

(75) Inventors: John C. Brazas, Hilton, NY (US); Louis R. Gabello, Rochester, NY (US); Marek Kowarz, Henrietta, NY (US); Lawrence A. Ray, Rochester, NY (US); Kenneth J. Repich, Fairport, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/916,995

(22) Filed: Jul. 27, 2001

(51) Int. Cl.$^7$ ................................................. G01C 3/08
(52) U.S. Cl. ....................................... 396/106; 356/5.1
(58) Field of Search ................. 396/106; 356/5.1–5.15; 348/135; 250/559.38

(56) References Cited

U.S. PATENT DOCUMENTS

| | | | |
|---|---|---|---|
| 6,088,086 A | * | 7/2000 | Muguira et al. ............ 356/5.15 |
| 6,288,776 B1 | * | 11/2001 | Cahill et al. .................. 356/5.1 |
| 6,349,174 B1 | * | 2/2002 | Ray et al. .................... 396/106 |
| 6,410,930 B1 | * | 6/2002 | Revelli, Jr. et al. ......... 356/5.1 X |

* cited by examiner

*Primary Examiner*—W. B. Perkey
(74) *Attorney, Agent, or Firm*—David M. Woods (57) ABSTRACT

A scannerless range imaging system includes an illumination system and an electromechanical light modulator. The illumination system illuminates objects in the scene with modulated illumination of a predetermined modulation frequency, and the modulated illumination reflected from objects in the scene incorporates a phase delay corresponding to the distance of the objects from the range imaging system. The electromechanical light modulator, which is positioned in an optical path of the reflected illumination, operates at a reference frequency that corresponds to the predetermined modulation frequency and accordingly modulates the modulated illumination reflected from the object, thereby generating a phase image from the interference between the reference frequency and the reflected modulated illumination. The system further includes an optical system that deflects the reflected illumination to the electromechanical light modulator and redirects the phase image generated by the electromechanical light modulator to an image capture section. A color image may be captured by moving the optical system out of the optical path such that reflected illumination from the object will pass directly to the image capture section without contacting the electromechanical light modulator.

25 Claims, 6 Drawing Sheets

COLOR SCANNERLESS RANGE IMAGING SYSTEM USING AN ELECTROMECHANICAL GRATING

FIELD OF THE INVENTION

The present invention relates to the field of three-dimensional image capture and in particular to techniques for modulating the reflected light in order to extract phase images and for capturing a color texture image in conjunction with the phase image.

BACKGROUND OF THE INVENTION

Distance (or depth) information from a camera to objects in a scene can be obtained by using a scannerless range imaging system having a modulated illumination source and a modulated image receiver. In a method and apparatus described in U.S. Pat. No. 4,935,616 (and further described in the Sandia Lab News, vol. 46, No. 19, Sep. 16, 1994), a scannerless range imaging system uses either an amplitude-modulated high-power laser diode or an array of amplitude-modulated light emitting diodes (LEDs) to simultaneously illuminate a target area. Conventional optics confine the target beam and image the target onto a receiver, which includes an integrating detector array sensor having hundreds of elements in each dimension. The range to a target is determined by measuring the phase shift of the reflected light from the target relative to the amplitude-modulated carrier phase of the transmitted light. To make this measurement, the gain of an image intensifier (in particular, a micro-channel plate) within the receiver is modulated at the same frequency as the transmitter, so the amount of light reaching the sensor (a charge-coupled device) is a function of the range-dependent phase difference. A second image is then taken without receiver or transmitter modulation and is used to eliminate non-range-carrying intensity information. Both captured images are registered spatially, and a digital processor is used to extract range data from these two frames. Consequently, the range associated with each pixel is essentially measured simultaneously across the whole scene.

The scannerless range imaging system described above utilizes an image intensifier (specifically, a micro-channel plate) of the type produced by Litton Industries. The primary purpose of the intensifier is to provide a reference frequency to operate upon the modulated light signal from the illuminator that is reflected from the target. By modulating the gain of the image intensifier the reflected, modulated light signal is multiplied by the intensifier gain and constructive and destructive interference is established. A primary application of the scannerless range imaging system is to enable a method of creating a virtual three-dimensional environment from photographs. While range data is an important part of this application, a so-called texture image is also needed. The texture image should ideally be captured with identical optical properties as the range data to assure proper registration between range and texture values. Furthermore, having a color texture image is highly desirable for many practical and commercial applications.

A drawback of methods using an image intensifier is that color information is lost. Unfortunately for color applications, an image intensifier operates by converting photonic energy into a stream of electrons, amplifying the energy of the electrons and then converting the electrons back into photonic energy via a phosphor plate. One consequence of this process is that color information is lost. Since color is a useful property of images for many applications, a means of acquiring the color information that is registered along with the range information is extremely desirable.

One approach to acquiring color is to place a dichromatic mirror in the optical path before the micro-channel-plate. Following the mirror a separate image capture plane (i.e., a separate image sensor) is provided for the range portion of the camera and another image capture plane (another sensor) is provided for the color texture capture portion of the camera. This is the approach taken by 3DV Technology with their Z-Cam product. Besides the added expense of two image capture devices, there are additional drawbacks in the need to register the two image planes precisely, together with alignment of the optical paths. Another difficulty is collating image pairs gathered by different sources.

Recognizing that the system described in the '616 patent may be implemented in relation to a normal camera system, and, in particular, that a standard camera system may be converted into a range capture system by modifying its optical system, another approach is to employ interchangeable optical assemblies: one optical assembly for the phase image portion and a separate optical element for the color texture image portion. This approach is described in detail in commonly assigned copending application Ser. No. 09/451,823, entitled "Method and Apparatus for a Color Scannerless Range Image System" and filed Nov. 30, 1999 in the names of Lawrence A. Ray, Louis R. Gabello and Kenneth J. Repich. The drawback of this approach is the need to switch lenses and the possible misregistration that might occur due to the physical exchange of lens elements. There is an additional drawback in the time required to swap the two optical assemblies, and the effect that may have on the spatial coincidence of the images.

In commonly-assigned, copending U.S. patent application Ser. No. 09/572,522, now U.S. Pat. No. 6,349,174 B1 entitled "Method and Apparatus for a Color Scannerless Range Imaging System" and filed May 17, 2000 in the names of Lawrence A. Ray and Louis R. Gabello, a beam-splitter located in the primary optical path separates the reflected image light into two channels, a first channel including an infrared component and a second channel including a color texture component, whereby one of the channels traverses a secondary optical path distinct from the primary path. A modulating element, i.e., an intensifier, is operative in the first channel to receive the infrared component and a modulating signal, and to generate a processed infrared component with phase data indicative of range information. An optical network is provided in the secondary optical path for recombining the secondary optical path into the primary optical path such that the processed infrared component and the color texture component are directed to the image responsive element. This technique eliminates the requirement for two image capture planes, as well as for interchangeable optical assemblies, and allows the operator to collect a full range map with texture with a single exposure activation.

In addition to the loss of color information, and the consequent necessity to devise techniques as described above to overcome this drawback, the image intensifier is a costly part and, in addition, can be fragile. In order to reduce the cost of the scannerless range imaging system, a less expensive alternative technology would be attractive. Since a primary purpose of the image intensifier is to act as a modulating shutter, an alternative technology will have to perform this task. What is needed is an alternative technology that would avoid the aforementioned limitations; in addition, it would be desirable to capture ranging information without sacrificing color information that would otherwise be available for capture.

SUMMARY OF THE INVENTION

It is an object of the invention to provide an alternative technology to an image intensifier for the receiver modulation function in a scannerless range imaging system.

It is a further object of the invention to capture a color texture image as well as one or more phase images on the same image plane for each point on the image.

The present invention is directed to achieving these objectives while overcoming one or more of the problems set forth above. Briefly summarized, according to one aspect of the present invention, a scannerless range imaging system for capturing range information of a scene includes an illumination system and an electromechanical light modulator. The illumination system illuminates objects in the scene with modulated illumination of a redetermined modulation frequency, whereby the modulated illumination reflected from objects in the scene incorporates a phase delay corresponding to the distance of the objects from the range imaging system. The electromechanical light modulator, which is positioned in an optical path of the modulated illumination reflected from the object, operates at a reference frequency that corresponds to the predetermined modulation frequency and accordingly modulates the modulated illumination reflected from the object, thereby generating an image from the interference between the reference frequency and the reflected modulated illumination. This captured image, which is thereafter referred to as a phase image, is used to derive range data. An image capture section, also positioned in the optical path of the modulated illumination reflected from the object, captures the phase image.

Since the electromechanical light modulator operates via modulating elements having reflective surfaces, the system further includes an optical system having a mirror element that deflects the reflected modulated illumination upon the reflective surfaces of the electromechanical light modulator and redirects the phase image reflected from the reflective surfaces of the electromechanical light modulator to the image capture section. A color image may be captured by moving the optical system out of the optical path such that reflected illumination from the object will pass directly to the image capture section without contacting the electromechanical light modulator. A preferred electromechanical light modulator is an electromechanical grating.

Consequently, an advantage of the invention is that it provides both an alternative to the intensifier and a simplified technique for capturing a color texture image as well as one or more phase images. A further advantage of the invention is that it eliminates the need for an expensive component, i.e., the intensifier, with a device that is significantly less expensive and less fragile. The electromechanical grating is also lighter in weight and more compact than a micro-channel plate, and uses a lower operating voltage. Moreover, the system is able to capture a color image in addition to the phase images without the sort of clever work-arounds shown in the prior art. The system is also able to operate in a continuous modulation mode or in a pulse mode.

These and other aspects, objects, features and advantages of the present invention will be more clearly understood and appreciated from a review of the following detailed description of the preferred embodiments and appended claims, and by reference to the accompanying drawings.

DETAILED DESCRIPTION OF THE INVENTION

Because range imaging devices employing laser illuminators and capture devices including image intensifiers and electronic sensors are well known, the present description will be directed in particular to elements forming part of, or cooperating more directly with, apparatus in accordance with the present invention. Elements not specifically shown or described herein may be selected from those known in the art. Certain aspects of the embodiments to be described may be provided in software. Given the system as shown and described according to the invention in the following materials, software not specifically shown, described or suggested herein that is useful for implementation of the invention is conventional and within the ordinary skill in such arts.

Figure 6:
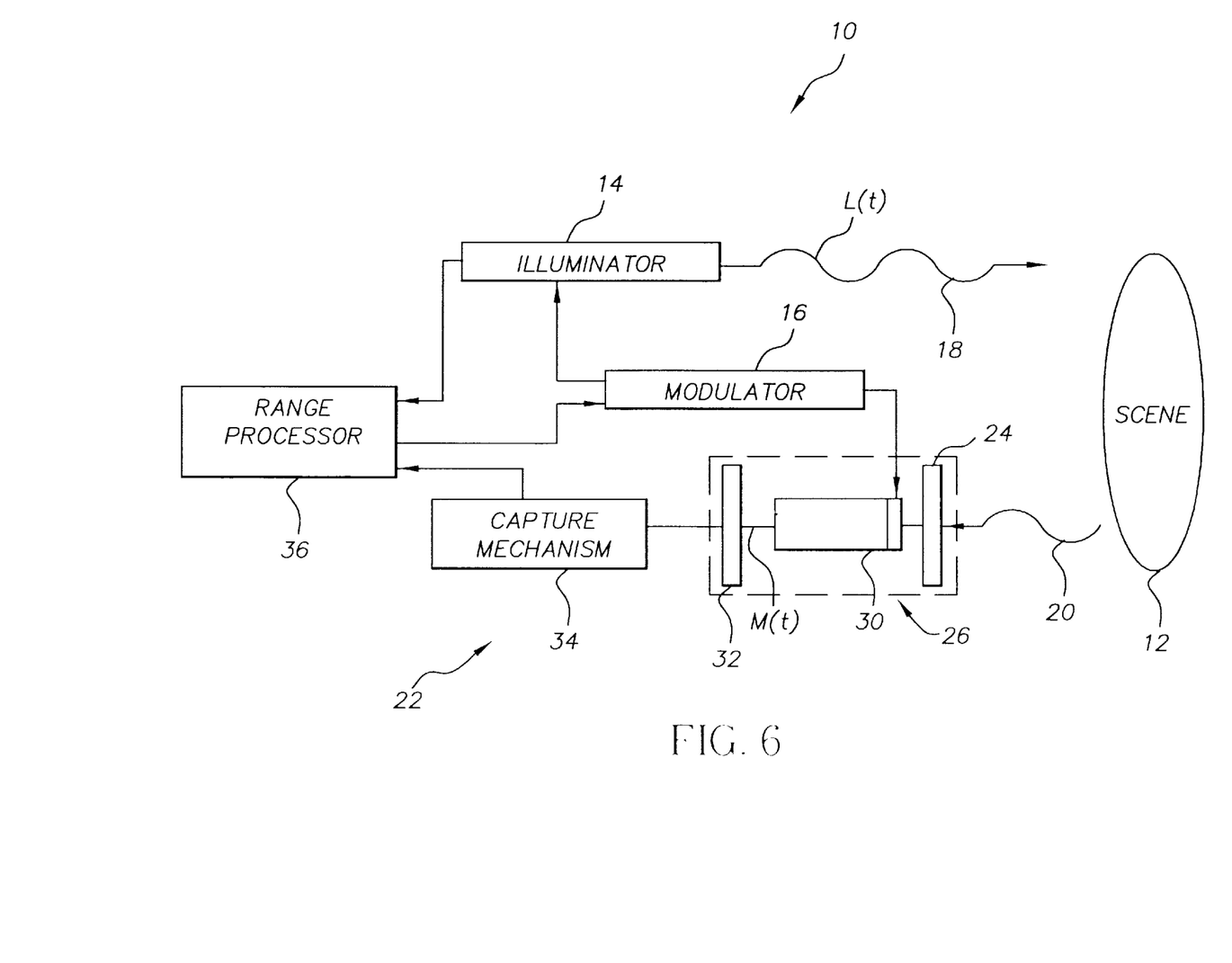
FIG. 6 is a block diagram of a known range imaging system which can be used to capture a bundle of images.

It is helpful to first review the principles and techniques involved in scannerless range imaging, as known in the prior art. Accordingly, referring first to FIG. 6, a known scannerless range imaging system 10 is shown as a laser radar that is used to illuminate a scene 12 and then to capture an image bundle comprising a minimum of three images of the scene 12. An illuminator 14 emits a beam of electromagnetic radiation whose frequency is controlled by a modulator 16. Typically, in the prior art, the illuminator 14 is a laser device which includes an optical diffuser in order to effect a wide-field illumination. The modulator 16 provides an amplitude varying sinusoidal modulation. The modulated illumination source is modeled by:

$$L(t) = \mu_L + \eta \sin(2\pi f t) \quad \text{(Eq. 1)}$$

where $\mu_L$ Is the mean illumination, $\eta$ is the modulus of the illumination source, and $f$ is the modulation frequency applied to the illuminator 14. The modulation frequency is sufficiently high (e.g., 12.5 MHz) to attain sufficiently accurate range estimates. The output beam 18 is directed toward the scene 12 and a reflected beam 20 is directed back toward a receiving section 22. As is well known, the reflected beam 20 is a delayed version of the transmitted output beam 18, with the amount of phase delay being a function of the distance of the scene 12 from the range imaging system. Typically, in the prior art, the reflected beam 20 strikes a photocathode 24 within an image intensifier 26, thereby producing a modulated electron stream proportional to the input amplitude variations. The gain modulation of the image intensifier 26 is modeled by:

$$M(t) = \mu_M + \gamma \sin(2\pi f t) \quad \text{(Eq. 2)}$$

where $\mu_M$ is the mean intensification, $\gamma$ is the modulus of the intensification and $f$ is the modulation frequency applied to the intensifier 26. The purpose of the image intensifier is not only to intensify the image, but also to act as a frequency mixer and shutter. Accordingly, the image intensifier 26 is connected to the modulator 16, causing the gain of a microchannel plate 30 to modulate. The electron stream from the photocathode 24 strikes the microchannel plate 30 and is mixed with a modulating signal from the modulator 16. The modulated electron stream is amplified through secondary emission by the microchannel plate 30. The intensified electron stream bombards a phosphor screen 32, which converts the energy into a visible light image. The intensified light image signal is captured by a capture mechanism 34, such as a charge-coupled device (CCD). The captured image signal is applied to a range processor 36 to determine the phase delay at each point in the scene. The phase delay term $\omega$ of an object at a range $\rho$ meters is given by:

$$\omega = \frac{4\pi \rho f}{c} \quad \text{(Eq. 3)}$$

where c is the velocity of light in a vacuum. Consequently, the reflected light at this point is modeled by:

$$R(t) = \mu_L + \kappa \sin(2\pi f t + \omega) \quad \text{(Eq. 4)}$$

where $\kappa$ is the modulus of illumination reflected from the object. The pixel response P at this point is an integration of the reflected light and the effect of the intensification:

$$P = \int_0^{2\pi} R(t)M(t)dt = 2\mu_L\mu_M + \kappa\pi\gamma\cos(\omega) \quad \text{(Eq. 5)}$$

In the range imaging system disclosed in the aforementioned '616 patent, a reference image is captured during which time the micro-channel plate is not modulated, but rather kept at a mean response. The range is estimated for each pixel by recovering the phase term as a function of the value of the pixel in the reference image and the phase image.

A preferred, more robust approach for recovering the phase term is described in commonly-assigned U.S. Pat. No. 6,118,946, entitled "Method and Apparatus for Scannerless Range Image Capture Using Photographic Film", which is incorporated herein by reference. Instead of collecting a phase image and a reference image, this approach collects at least three phase images (referred to as an image bundle). This approach shifts the phase of the intensifier 26 relative to the phase of the illuminator 14, and each of the phase images has a distinct phase offset. For this purpose, the range processor 36 is suitably connected to control the phase offset of the modulator 16, as well as the average illumination level and such other capture functions as may be necessary. If the image intensifier 26 (or laser illuminator 14) is phase shifted by $\theta_i$, the pixel response from equation (5) becomes:

$$P_i = 2\mu_L\mu_M\pi + \kappa\pi\gamma \cos(\omega+\theta_i) \quad \text{(Eq. 6)}$$

It is desired to extract the phase term $\omega$ from the expression. However, this term is not directly accessible from a single image. In equation (6) there are three unknown values and the form of the equation is quite simple. As a result, mathematically only three samples (from three images) are required to retrieve an estimate of the phase term, which is proportional to the distance of an object in the scene from the imaging system. Therefore, a set of three images captured with unique phase shifts is sufficient to determine $\omega$.

For simplicity, the phase shifts are given by $\theta_k = 2\pi\kappa/3$, $\kappa=0,1,2$. In the following description, an image bundle shall be understood to constitute a collection of images which are of the same scene, but with each image having a distinct phase offset obtained from the modulation applied to the intensifier 26. It should also be understood that the analysis can also be performed by phase shifting the illuminator 14 instead of the intensifier 26. If an image bundle comprising more than three images is captured, then the estimates of range can be enhanced by a least squares analysis using a singular value decomposition (see, e.g., W. H. Press, B. P. Flannery, S. A. Teukolsky and W. T. Vetterling, *Numerical Recipes (the Art of Scientific Computing)*, Cambridge University Press, Cambridge, 1986).

If images are captured with $n \geq 3$ distinct phase offsets of the intensifier (or laser or a combination of both) these images form an image bundle. Applying Equation (6) to each image in the image bundle and expanding the cosine term (i.e., $P_i = 2$, $\mu_L\mu_M\pi + \kappa\pi\gamma(\cos(\omega)\cos(\theta_i) - \sin(\omega)\sin(\theta_i))$) results in the following system of linear equations in n unknowns at each point:

$$\begin{pmatrix} P_1 \\ P_2 \\ \vdots \\ P_n \end{pmatrix} = \begin{pmatrix} 1 & \cos\theta_1 & -\sin\theta_1 \\ 1 & \cos\theta_2 & -\sin\theta_2 \\ \vdots & \vdots & \vdots \\ 1 & \cos\theta_n & -\sin\theta_n \end{pmatrix} \begin{pmatrix} \Lambda_1 \\ \Lambda_2 \\ \Lambda_3 \end{pmatrix} \quad \text{(Eq. 7)}$$

where $\Lambda = 2\mu_L\mu_M\pi$, $\Lambda_2 = \kappa\pi\gamma \cos \omega$, and $\Lambda_3 = \kappa\pi\gamma \sin \omega$. This system of equations is solved by a singular value decomposition to yield the vector $\Lambda = [\Lambda_1, \Lambda_2, \Lambda_3]^T$. Since this calculation is carried out at every (x,y) location in the image bundle, $\Lambda$ is really a vector image containing a three element vector at every point. The phase term $\omega$ is computed at each point using a four-quadrant arctangent calculation:

$$\omega = \tan^{-1}(\Lambda_3, \Lambda_2) \quad \text{(Eq. 8)}$$

The resulting collection of phase values at each point forms the phase image. Once phase has been determined, range p can be calculated by:

$$\rho = \omega \frac{c}{4\pi f} \quad \text{(Eq. 9)}$$

Equations (1)–(9) thus describe a method of estimating range using an image bundle with at least three images (i.e., n=3) corresponding to distinct phase offsets of the intensifier and/or illuminator.

What the present invention specifically addresses is an alternative technology to the image intensifier 26, as used in the prior art. The preferred alternative technology is an electromechanical grating, which is in the class of electromechanical light modulators. The electromechanical grating is a device with a periodic sequence of reflective elements that form electromechanical phase gratings. In such devices, the incident beam is selectively reflected or diffracted into a number of discrete orders. Depending on the application, one or more of these diffracted orders may be collected and used by the optical system.

An electromechanical grating with a fast response time is a binary electromechanical grating made of suspended micro-mechanical ribbon elements as described in Bloom et al., "Method and Apparatus for Modulating a Light Beam," U.S. Pat. No. 5,311,360, issued May 10, 1994. This device, also known as a grating light valve (GLV), can be fabricated with CMOS-like processes on silicon. Improvements in the device were later described by Bloom, et al. that included: 1) patterned raised areas beneath the ribbons to minimize contact area to obviate stiction between the ribbons and the substrate, and 2) an alternative device design in which the spacing between ribbons was decreased and alternate ribbons were actuated to produce good contrast (see Bloom, et al., "Deformable Grating Apparatus for Modulating a Light Beam and Including Means for Obviating Stiction Between Grating Elements and Underlying Substrate," U.S. Pat. No. 5,459,610, issued Oct. 17, 1995). An alternative electromechanical grating with a partially conformal grating structure and a potentially higher fill factor was described by Kowarz in "Spatial Light Modulator with Conformal Grating Elements," U.S. patent application Ser. No. 09/491,354, filed Jan. 26, 2000 (CIP Ser. No. 09/867,927 filed May 30, 2001). The disclosures of each of these patents, and the patent applications, are incorporated herein by reference.

As will be clear to those of ordinary skill in this art, when the electromechanical grating is used in place of the intensifier, the method of estimating range using an image bundle will remain essentially the same as described above in relation to FIG. 6 except that the output M(t) of the modulating element represented by Eq. (2) would be modified to represent the effect produced by the electromechanical grating. This modification would carry through the remaining equations, although the basic logic and the model would remain the same. In particular, the principles for range determination remain exactly the same, that is, the range is determined using an image bundle with at least three images (i.e., n=3) corresponding to distinct phase offsets of the modulator and/or illuminator.

Figure 1:
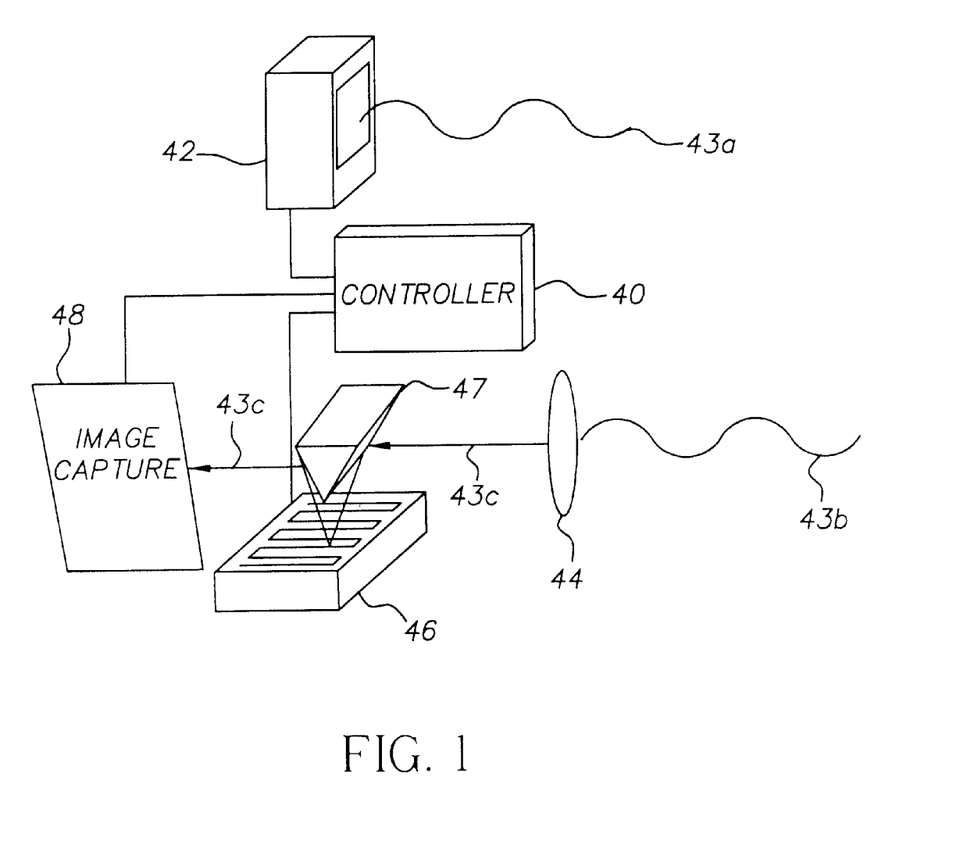
FIG. 1 is a system level diagram of a scannerless range imaging system in accordance with the invention.

Referring now to FIG. 1, the overall scannerless range imaging (SRI) system is shown as a range camera comprised of a number of subsystems, including a controller 40, an illuminator 42, a lens/shutter combination 44, an electromechanical grating light modulator 46, a mirror 47 and an image capture subsystem 48. The image capture subsystem 48 includes a photosensor, e.g., a photosensitive film or an electronic sensor, such as a charge-coupled device (CCD). The controller 40 manages the workflow within the device, sequences the events and establishes one or more baseline system frequencies. The illuminator 42 emits amplitude-modulated light, preferably in the infrared band. The controller 40 also has the ability to phase shift the modulation signal to the illuminator 42 relative to a reference modulation within the controller 40. The lens/shutter 44 controls the image focal length, the field of view and other normal properties of photographic lenses and shutters. The electromechanical grating 46 operates at a reference frequency that is managed by the controller 40. The purpose of the electromechanical grating 46 is to mix a reference frequency with the reflected light from objects in the scene. The electromechanical grating 46 is tuned to have maximum efficiency at the same wavelength as emitted by the illuminator. The image capture subsystem 48 records the frames captured by the SRI (Scannerless Range Imaging) system for subsequent processing. In the preferred embodiment, a single image capture plane responsive to the infrared spectrum is employed for the photosensitive element; in addition, if a color texture image is to be captured, the photosensitive element must be capable of responding to light in the visible spectrum.

The illumination and reception aspect of the SRI system shown in FIG. 1 generally operates as described in connection with the known system shown in FIG. 6, that is, an output beam 43a is directed toward a scene and a reflected beam 43b is directed back toward the receiving section, which includes the lens/shutter combination 44, the electromechanical grating 46 and the image capture subsystem 48. As is well known, the reflected beam 43b is a delayed version of the transmitted output beam 43a, with the amount of phase delay being a function of the distance of the scene from the SRI system. Unlike the prior art, the reflected beam 43b is deflected from the system optical path 43c and upon the electromechanical grating 46, thereby producing a modulated light image signal. The modulated light image signal is then deflected back into the optical path 43c and captured by the image capture subsystem 48, such as a charge-coupled device (CCD). Though not shown specifically in FIG. 1, the captured image signal is applied to a range processor of the type shown in FIG. 6 to determine the phase delay at each point in the scene. The foregoing system is sufficient to capture a phase image. If a color texture image is also to be captured, the mirror 47 is retracted out of the optical path and the color texture image is directly transmitted to the image capture subsystem 48.

The controller 40 is the overall device manager and has the task of communicating with the subsystems to sequence events, to provide proper power to the devices and to provide a common synchronizing frequency. Subsequent descriptions of each subsystem include the interface of the subsystem with the controller. The controller is the primary interface of a user with the system. A user need only trigger the device once and the system creates a complete image bundle.

Figure 2:
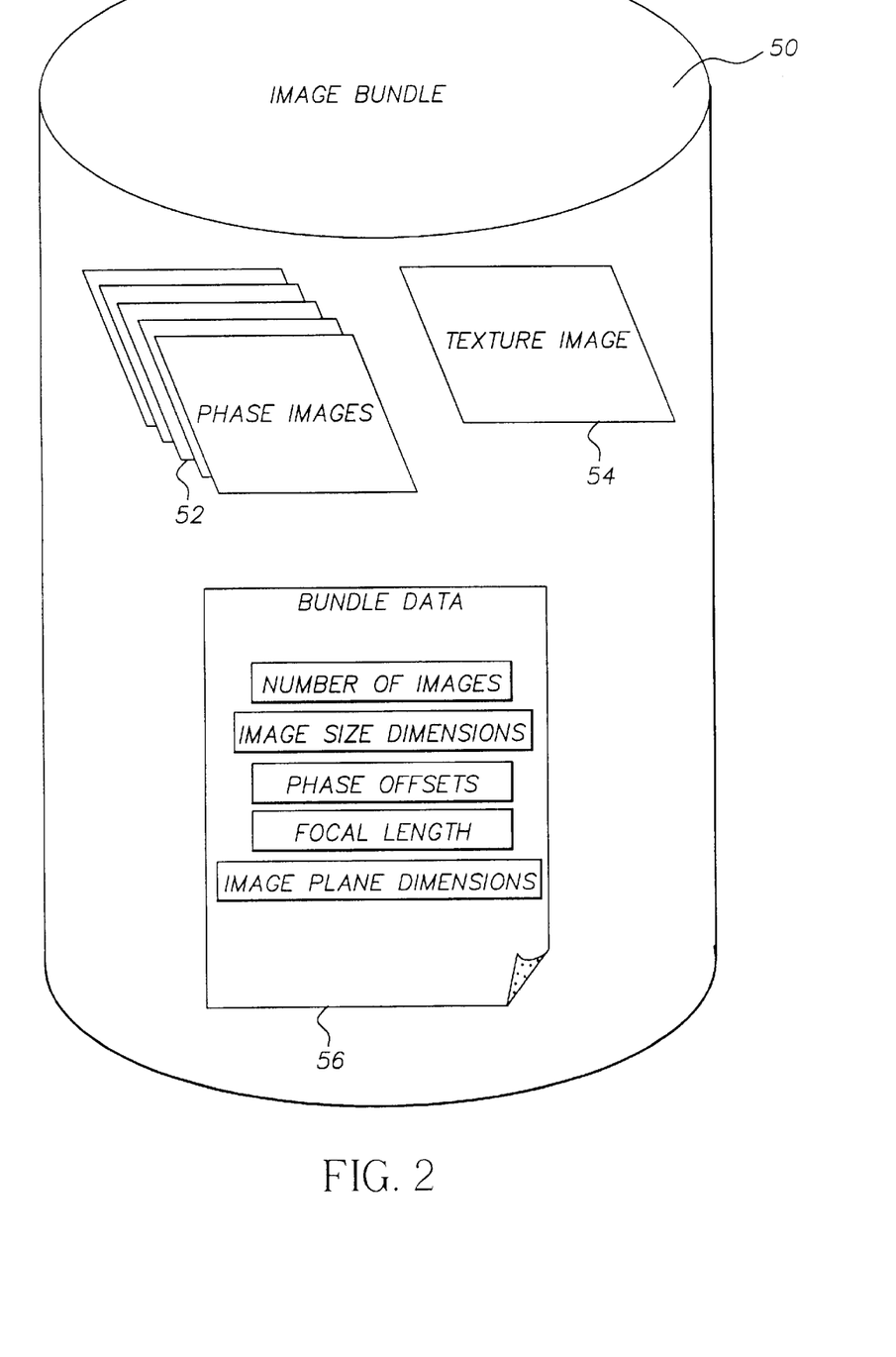
FIG. 2 is a diagram illustrating an image bundle and related data captured by the system shown in FIG. 1.

As shown in relation to FIG. 2, the notion of an image bundle 50 is central to the range estimation method. The image bundle 50 includes a combination of images 52, 54 captured by the system as well as information (bundle data 56) pertinent to the individual images and information common to all the images. The image bundle contains two types of images: a set of phase images 52 related to the range capture portion of the process and a color image 54, commonly referred to as the texture image. For the set of phase images, each phase image is acquired while the illuminator 42 is operating with a phase offset from the reference frequency supplied by the controller 40. The color image 54 is acquired when the electromechanical grating 46 is inactive. Common information in the image bundle data 56 would typically include the number of phase images in the bundle (three or more) and the modulation frequency utilized by the camera system. Other information might be the focal length of the lens, the size of the image plane, the number of horizontal and vertical pixels in the images, the field-of-view of the imaging system and/or data related to camera status at the time of the image capture. This information will be used in subsequent processing to convert the image values into three-dimensional positions of each pixel in space relative to the camera location and orientation.

Image specific information in the image bundle data 56 will include the phase offset 1. . . N used for each (1. . . N) of the individual phase images 52. The image bundle 50 includes a minimum of three such images, each of which are monochrome. Each of the phase images 52 records the effect of a distinct phase offset applied to either the illumination system 42 or the electromechanical grating 46. The additional color image 54 is an image that does not contain range capture components, instead containing the color texture information in the actual image. Although this is a color image, it is preferably, but not necessarily, the same size as the phase images 52.

Figure 3:
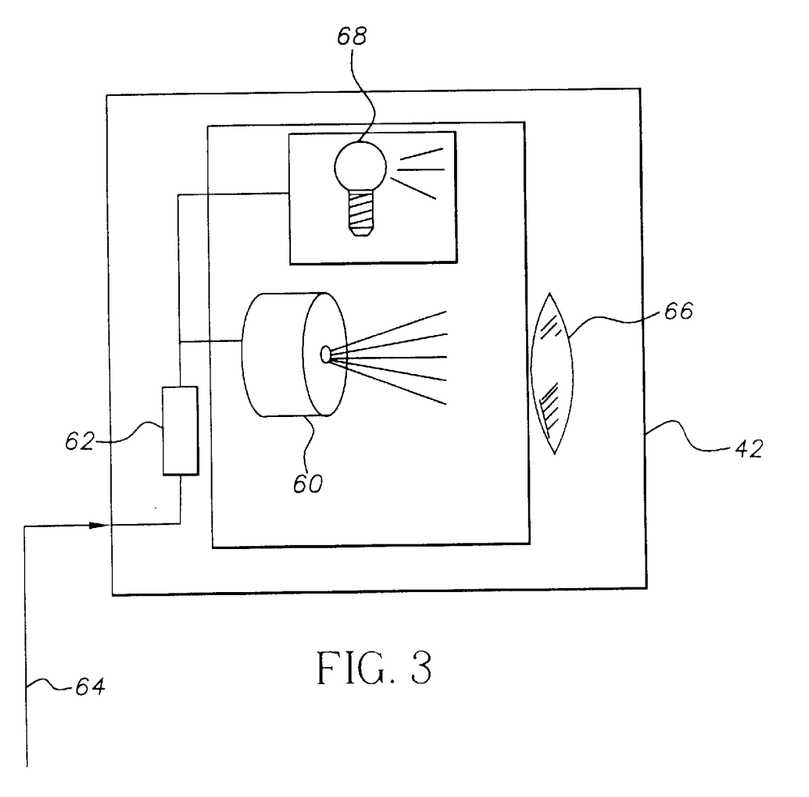
FIG. 3 is a diagram showing more detail of the illumination system shown in FIG. 1.

The illuminator 42 shown in FIG. 3 has the primary purpose of producing an amplitude-modulated illumination with its phase controllable for generating a shift in the transmitted wave pattern for each phase image 52 in the image bundle 50 (although, as mentioned before, this function may be performed by modulation of the reflected illumination in the capture portion of the color scannerless range imaging system). The illuminator 42 includes a light source, which is preferably a laser light source 60 operating in the infrared band with a power output intensity of about 0.5 watt, and a modulation circuit 62 controllable through a line 64 from the controller 40 (see FIG. 1), for generating the requisite modulation signals of predetermined frequency with a set of predetermined phase offsets. The emitted power should be designed to be maximal while maintaining compliance with Class 1 laser operation. The laser light source 60 is preferably modulated at a modulation frequency on the order of about 10 megahertz, although this frequency may be adjusted to account for operating speeds of other subsystems in the SRI system, and the preferred phase offsets, as mentioned earlier, are phase shifts θ in each phase image given by $\theta_k=2\pi\kappa/3$; $\kappa=0,1,2$. The preferred wavelength of the laser light is about 830 nm, as this wavelength provides an optimal balance between concerns for eye-safety and for the typical response of the overall system as described. Although the laser light need not necessarily be uniformly distributed, a diffusion lens 66 is positioned in front of the laser light source 60 in order to spread the modulated light across the desired field of view as uniformly as possible.

An alternative light source 60 can be a plurality of amplitude-modulated infrared light-emitting diodes (LEDs) which are driven to generate a modulated signal according to the phase and frequency of a drive signal. The illuminator 42 also includes a standard wide-band illuminator 68 that is not modulated. This illumination source is used for normal photographic images, e.g., for the color texture image. This illuminator device 68 may be a commonly known and understood flash of a standard camera system, e.g., a commonly available electronic flash of the type useful with photographic cameras. The illuminator 42 is connected via the control line 64 to the controller 40, which directs the illuminator 42 to operate in either of the following modes: a) a first mode in which the laser is operated to illuminate the scene with a plurality (bundle) of exposures, each with a unique phase offset applied to its modulated frequency; and b) a second mode in which the standard wide-band illuminator 68 is turned on and the flash is initiated by the controller during capture of the color texture image. If ambient light is sufficient, of course, it may be unnecessary for the illuminator 42 to operate in the second mode in order to capture a color image-in that case, the image capture device would be instructed to operate without flash. Moreover, the sequence of image capture may be reversed, that is, the second mode may be engaged before the first mode or, indeed, the second mode might in specific situations be engaged between the several exposures of the first mode. The illuminator 42 also communicates with the controller 40 via the line 64 to indicate that all systems are ready for use. While not shown, it is preferable for the system to have some visible indicator to the operator that the laser source is powered, as the laser is invisible to the human eye.

Figure 4:
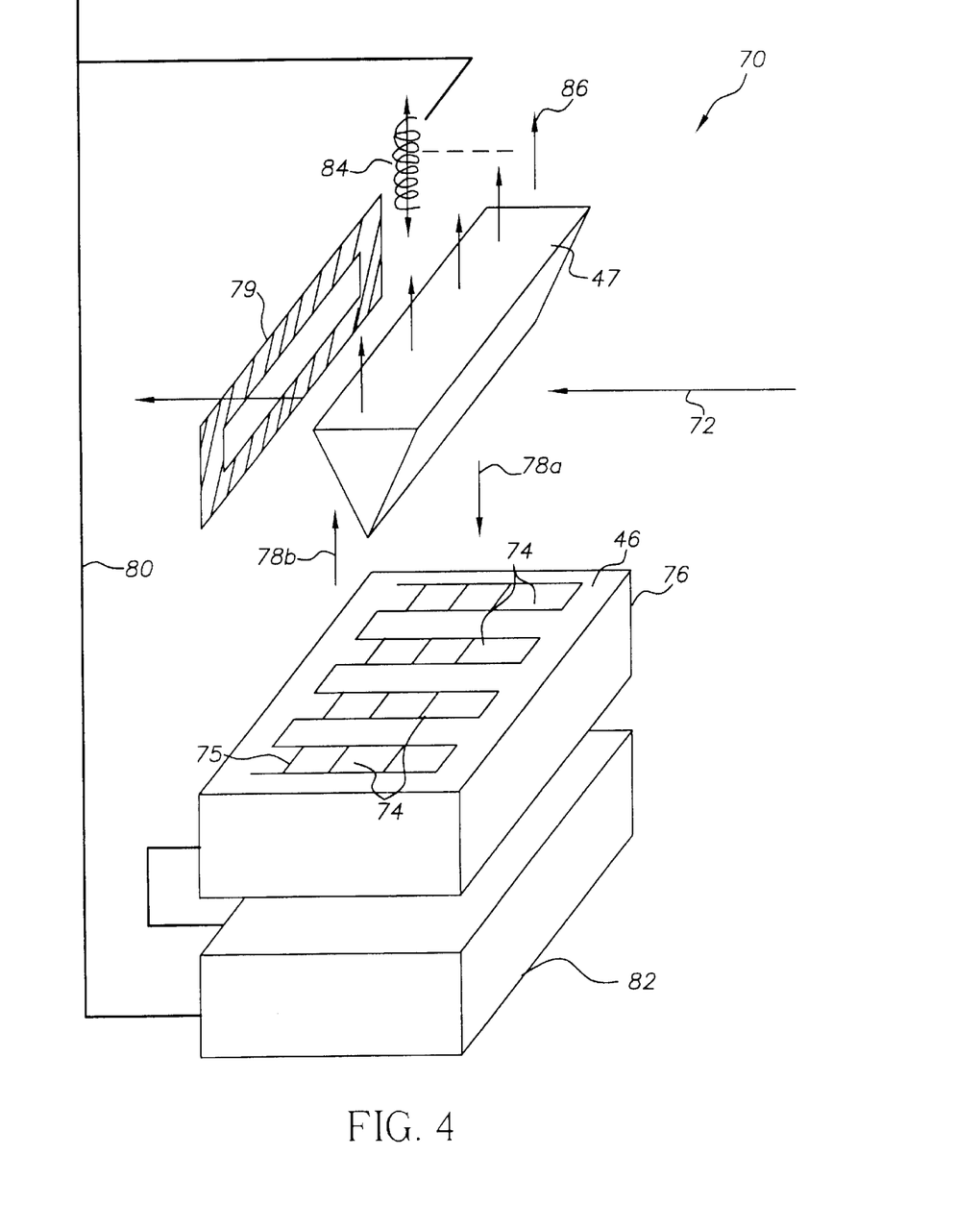
FIG. 4 is a diagram showing more detail of the electromechanical grating shown in FIG. 1.

Referring to the modulation system 70 shown in FIG. 4, the electromechanical grating 46 is used to modulate the reflected light 72 returning from objects illuminated by the illuminator subsystem 42. In the preferred embodiment, the electromechanical grating 46 is a conformal grating device of the type illustrated in the aforementioned U.S. patent application Ser. No. 09/491,354, which is incorporated herein by reference. As conceptually shown in FIG. 4 for illustrative purposes, a pattern of elongated reflective ribbon elements 74 are supported at their respective ends and at several intermediate support locations 75 (shown in broken line to indicate their location underneath the ribbon elements) on a substrate structure 76. The center-to-center separation of the intermediate supports and the mechanical properties of the ribbon element define the mechanical resonant frequency of the conformal grating devices in their actuated state. A signal generator 82 applies a corresponding modulating voltage between the substrate structure 76 and the ribbon elements 74, as a result, an electrostatic force generated by the voltage causes the ribbon elements 74 to deform in synchronism with the modulating frequency. In this actuated state, the incident beam 78a is diffracted into a number of discrete diffracted orders. In the unactuated state, with no applied voltage difference, the ribbon element is suspended flat between its supports and the incident beam 78a is primarily reflected 78b into the direction of the mirror. The aperture 79 allows the reflected light to pass in the return beam 78b and blocks the diffracted orders. To obtain a greater depth of modulation at the expense of the complexity of the optical system, the reflected light can be blocked and the diffracted orders can be passed through the system. In actual practice, the area of the electromechanical grating 46 would be designed to fill the image space with thousands of ribbon elements. Furthermore, the electromechanical grating 46 responds to light at preferred wavelengths, and is tuned to the same wavelength as the infrared light produced by the laser source 60. Further details of the electromechanical grating, including more detailed renderings of the actual structure of the device, can be found in the aforementioned U.S. patent application Ser. No. 09/491,354, which is incorporated herein by reference.

The system 70 is controlled through a control line 80 attached to the system controller 40 and through the signal generator 82 driving the electromechanical grating 46. (While shown as a separate component, the signal generator 82 may be integrated together with the electromechanical grating in a common CMOS-like element.) The signal generated by the signal generator 82 is in synchronization with the overall system frequency provided by the controller 40 and serves as a reference waveform that beats against the reflected waveform. Typically, the electromechanical grating 46 has a natural resonance frequency between 5 and 15 MHz. For an electromechanical grating 46 that is sufficiently damped, the signal generator 82 periodically drives the device between the unactuated state and the actuated state at a frequency lower than resonance, generating light intensity modulation at this frequency. Alternatively, for an underdamped electromechanical grating 46, the signal generator 82 drives the device at resonance. In this resonant mode of operation, the ribbon elements 74 oscillate symmetrically about their unactuated position and generate sinusoidal light intensity modulation at twice the resonance frequency.

Since the electromechanical grating 46 is activated when a phase image is to be captured and is inactive when a color texture image is captured, the retractable mirror 47 is operated to position the mirror in-line such that one of its facets deflects the light 78a toward the surface of the electromechanical grating 46 when phase images are being captured. The returned light 78b is then modulated by the electromechanical grating 46 and reflected back to the other facet of the retractable mirror 47, which redirects the light toward the image capture subsection 48. When the color texture image is being collected, the mirror is retracted sufficiently far in order to eliminate it from interfering with the incoming light. As a result, the system is able to record visible light necessary for the color texture image. While many different types of devices may be used to toggle the mirror back and forth, FIG. 4 shows a solenoid 84 connected to the mirror 47 to drive the mirror in the direction of the arrows 86 when so instructed by the controller 40. The electromechanical grating may operate either in the continuous modulation mode as described herein or in a pulse mode. If the pulse mode operation is desired, then the image capture and range estimation approach follows a waveform analysis based on gating the modulation at preselected points. This has been disclosed in prior disclosures, such as U.S. Pat. No. 5,081,530 (which is incorporated herein by reference), for range cameras and details of the approach are not included here.

Figure 5:
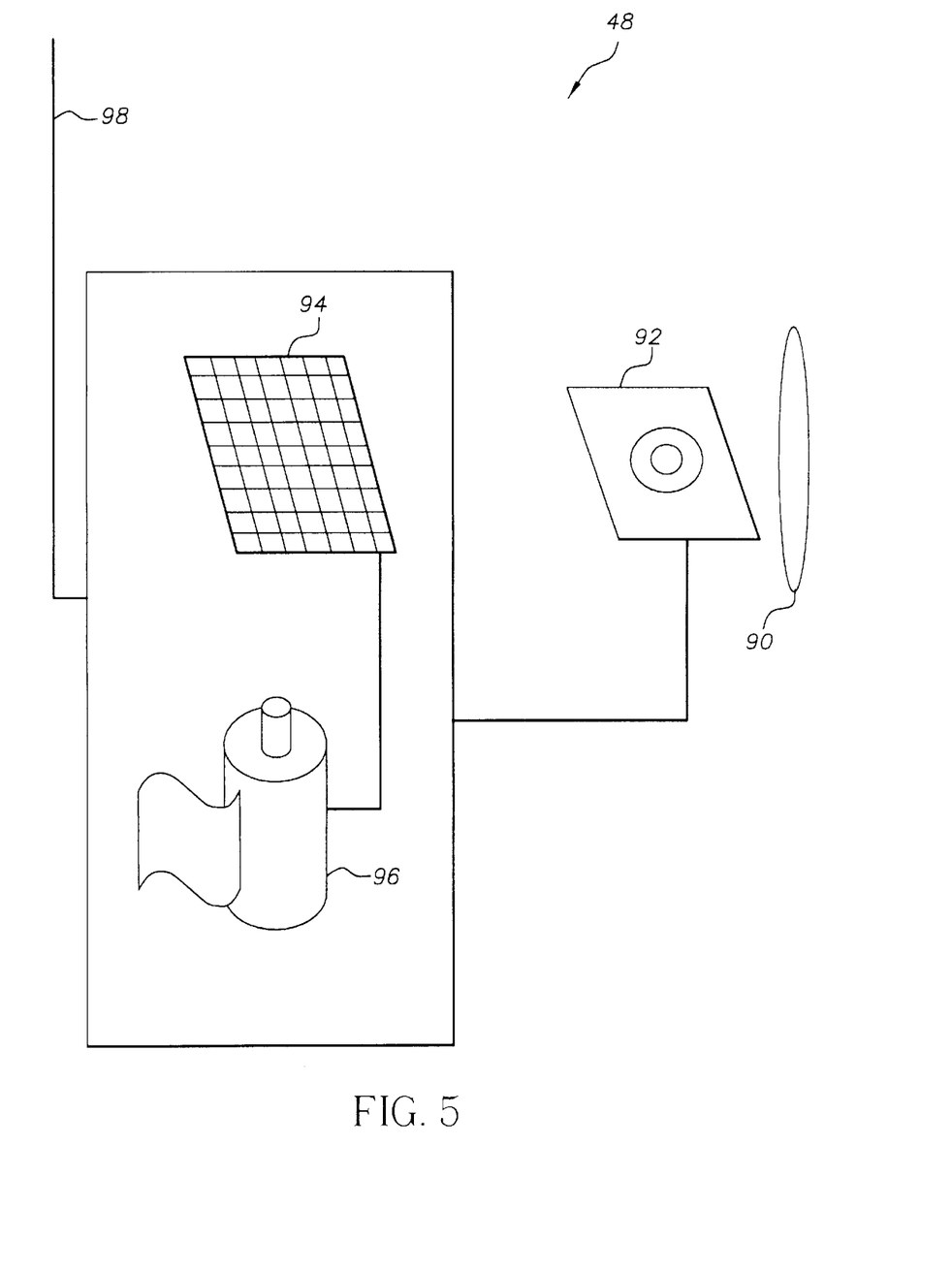
FIG. 5 is a diagram showing more detail of the image capture system shown in FIG. 1.

In referring to FIG. 5, the image capture subsystem 48 of the SRI device shares the properties common to most camera systems: a lens 90 and shutter 92 integral with the image capture subsystem (or, alternatively, the separate lens/shutter 44 shown in FIG. 1), an image capture plane 94 and an image storage capability 96. As mentioned above, the image capture plane 94 includes a photosensor, e.g., a photosensitive film or an electronic sensor, such as a charge-coupled device (CCD). If a film is located in the image capture plane 94, then the film itself is the image storage capability 96. On the other hand, if an electronic sensor is located in the image capture plane 94, then the image storage capability 96 is an electronic storage device, such as resident solid state memory (e.g., RAM or ROM) or a removable memory (e.g., a memory card). In addition, this subsystem 48 may also responsible for collecting and storing some or all of the data portion of the image bundle described above. The controller 40 of the device triggers the image capture subsystem 48 on a control line 98. In turn the system opens the shutter 92, records the image on the image capture plane 94 and stores an image in the image storage 96 prior to a subsequent exposure period. Furthermore, the system could provide a range processor of the type shown in FIG. 6 to extract the images from the image bundle for external processing, though this is not explicitly indicated in FIG. 5. This range processor could be integral with the SRI camera or located in an ancillary processor.

The invention has been described with reference to a preferred embodiment. However, it will be appreciated that variations and modifications can be effected by a person of ordinary skill in the art without departing from the scope of the invention.

PARTS LIST 10 range imaging system
12 scene
14 illuminator
16 modulator
18 output beam
20 reflected beam
22 receiving section
24 photocathode
26 image intensifier
30 microchannel plate
32 phosphor screen
34 capture mechanism
36 range processor
40 controller
42 illuminator
43a output beam
43b reflected beam
43c optical path
46 electromechanical grating
47 mirror
48 image capture subsystem
50 image bundle
52 phase images
54 texture (color) image
56 bundle data
60 laser light source
62 modulation circuit
64 line to the controller
66 diffusion lens
68 wide-band illumination
70 modulation system
72 reflected light
74 ribbon elements
75 support locations
76 substrate structure
78a incident beam
78b return beam
79 aperture
80 line from the controller
82 signal generator
84 solenoid
86 direction arrow
90 lens
92 shutter
94 image capture plane
96 image storage capability
98 control line

What is claimed is:

1. A scannerless range imaging system for capturing range information of a scene, said system comprising;

an illumination system for controllably illuminating the scene with modulated illumination of a predetermined modulation frequency, whereby modulated illumination reflected from an object in the scene incorporates a phase delay corresponding to a distance of the object from the range imaging system;

an electromechanical light modulator positioned in an optical path of the modulated illumination reflected from the object, wherein the electromechanical light modulator operates at a reference frequency that corresponds to the predetermined modulation frequency and accordingly modulates the modulated illumination reflected from the object, thereby generating a phase image from the interference between the reference frequency and the modulated illumination reflected from the object; and an image capture section positioned in the optical path of the modulated illumination reflected from the object for capturing the phase image, whereby the range information is derived from the phase image.

2. The range imaging system as claimed in claim 1 wherein the electromechanical light modulator includes modulating elements having reflective surfaces, said system further including an optical system interposed in the optical path and comprised of a mirror element that deflects the reflected illumination upon the reflective surfaces of the electromechanical light modulator and redirects the phase image generated by the reflective surfaces to the image capture section.

3. The range imaging system as claimed in claim 2 wherein the optical system is movable out of the optical path such that reflected illumination from the object will pass directly to the image capture section without contacting the electromechanical light modulator.

4. The range imaging system as claimed in claim 3 wherein the image capture section captures at least one phase image used to derive a range image and another image of reflected unmodulated illumination corresponding to color in the scene when the optical system is moved out of the optical path.

5. The range imaging system as claimed in claim 1 wherein the electromechanical light modulator is an electromechanical grating.

6. The range imaging system as claimed in claim 1 wherein the image capture section includes a photosensitive film for capturing the phase image.

7. The range imaging system as claimed in claim 1 wherein the image capture section includes an electronic image sensor for capturing the phase image.

8. The range imaging system as claimed in claim 1 wherein the image capture section captures a plurality of phase images corresponding to the reflected modulated illumination, wherein each phase image incorporates the effect of the predetermined modulation frequency together with a phase offset unique for each image.

9. The range imaging system as claimed in claim 8 wherein each unique phase offset $\theta$ is given by $\theta_i=2\pi i/3$; i=0,1,2.

10. The range imaging system as claimed in claim 8 wherein the image capture section further comprises means for storing the phase images as a bundle of associated images.

11. The range imaging system as claimed in claim 1 wherein the illumination system includes either a laser illuminator or an array of light emitting diodes for producing the modulated illumination.

12. The range imaging system as claimed in claim 1 wherein the predetermined modulation frequency is in the infra-red spectrum.

13. A color scannerless range imaging system for capturing both color and range information of a scene, said system comprising;

an illumination system for controllably illuminating objects in the scene with modulated illumination of a predetermined modulation frequency, whereby modulated illumination reflected from an object in the scene incorporates a phase delay corresponding to a distance of the object from the range imaging system;

a modulation section including (a) an electromechanical light modulator positioned in an optical path of the modulated illumination reflected from the object, wherein the electromechanical light modulator operates at a reference frequency that corresponds to the predetermined modulation frequency and accordingly modulates the modulated illumination reflected from the object, thereby generating a phase image from the interference between the reference frequency and the modulated illumination reflected from the object, wherein said phase images are used to derive the range information, and (b) an optical system located in the optical path to transmit the reflected modulated illumination to the image capture section via the electromechanical grating when a phase image is to be captured;

an image capture section positioned in the optical path of the modulated illumination reflected from the object for capturing a plurality of images thereof, including (a) at least one phase image corresponding to the reflected modulated illumination and (b) at least one other image of reflected unmodulated illumination corresponding to color in the scene; and a controller for activating the modulation section when a phase image is to be captured and inactivating the modulation section when a color image is to be captured.

14. The range imaging system as claimed in claim 13 wherein the electromechanical light modulator includes modulating elements having reflective surfaces, said optical system further includes a mirror element having facets that deflect the reflected modulated illumination upon the reflective surfaces of the electromechanical light modulator and redirect the phase image generated by the reflective surfaces of the electromechanical light modulator to the image capture section.

15. The range imaging system as claimed in claim 14 wherein the controller inactivates the modulation section by moving the optical system out of the optical path such that the reflected unmodulated illumination corresponding to color in the scene will pass directly to the image capture section without contacting the electromechanical light modulator.

16. The range imaging system as claimed in claim 13 wherein the electromechanical light modulator is an electromechanical grating.

17. The range imaging system as claimed in claim 13 wherein the image capture section includes a photosensitive film for capturing the phase image.

18. The range imaging system as claimed in claim 13 wherein the image capture section includes an electronic image sensor for capturing the phase image and the color image.

19. The range imaging system as claimed in claim 13 wherein the image capture section captures a plurality of phase images corresponding to the reflected modulated illumination, wherein each phase image incorporates the effect of the predetermined modulation frequency together with a phase offset unique for each image.

20. The range imaging system as claimed in claim 19 wherein each unique phase offset $\theta$ is given by $\theta_i=2\pi i/3$; i=0,1,2.

21. The range imaging system as claimed in claim 19 wherein the image capture section further comprises means for storing the phase images and the color image as a bundle of associated images.

22. The range imaging system as claimed in claim 13 wherein the illumination system includes either a laser illuminator or an array of light emitting diodes for producing the modulated illumination.

23. The range imaging system as claimed in claim 13 wherein the predetermined modulation frequency is in the infra-red spectrum.

24. The range imaging system as claimed in claim 13 wherein the illumination system also emits unmodulated illumination and the reflected illumination includes unmodulated illumination originating with the illumination system and reflected from objects in the scene.

25. The range imaging system as claimed in claim 13 wherein the reflected illumination includes unmodulated illumination from ambient illumination reflected from objects in the scene.

* * * * *